United States Patent [19]
Patterson et al.

[11] Patent Number: 5,255,300
[45] Date of Patent: Oct. 19, 1993

[54] FUEL ASSEMBLY FOR BOILING WATER REACTORS

[75] Inventors: John F. Patterson, Richland; Richard H. Ewing, W. Richland, both of Wash.

[73] Assignee: Siemens Power Corporation, Bellevue, Wash.

[21] Appl. No.: 737,859

[22] Filed: Jul. 30, 1991

[51] Int. Cl.$^5$ .............................................. G21C 3/00
[52] U.S. Cl. .................................... 376/423; 376/444; 376/435
[58] Field of Search ............... 376/423, 420, 424, 435, 376/443, 444, 456, 439, 457; 926/DIG. 60, DIG. 64

[56] References Cited

U.S. PATENT DOCUMENTS

| | | | |
|---|---|---|---|
| 4,664,882 | 5/1987 | Doshi | 376/423 |
| 4,708,846 | 11/1987 | Patterson et al. | 376/444 |
| 4,957,698 | 9/1990 | Ritter | 376/444 |
| 4,968,479 | 11/1990 | Ogiya et al. | 376/428 |

FOREIGN PATENT DOCUMENTS

| | | |
|---|---|---|
| 3824082 | 1/1989 | Fed. Rep. of Germany . |
| 56-70488 | 12/1981 | Japan . |
| 59-180390 | 10/1984 | Japan . |
| 60-201284 | 10/1985 | Japan . |

OTHER PUBLICATIONS

Technical Note: On The Effect Of A Moderator In The Central Region Of A Hollow Fuel Element Annals Of Nuclear Energy vol. 7, (pp. 519 to 522) 1980.

Primary Examiner—Donald P. Walsh
Assistant Examiner—Meena Chelliah
Attorney, Agent, or Firm—Ira Lee Zebrak

[57] ABSTRACT

A fuel assembly for a boiling water nuclear reactor is provided comprising an elongated central water channel including wall members that define an enclosed fluid flow path therethrough, the channel includes a lower opening for receiving water and allowing water to flow through the fluid flow path and at least one outlet opening. At least one partial water rod is provided that is coupled to a partial fuel rod so as to be disposed axially above the partial fuel rod. The partial water rod includes an inlet opening in fluid communication with the outlet opening of the central water channel so as to allow water to flow from the water channel into an interior of the partial water rod.

22 Claims, 3 Drawing Sheets

FUEL ASSEMBLY FOR BOILING WATER REACTORS

BACKGROUND OF THE INVENTION

The present invention relates generally to nuclear fuel assemblies for use in nuclear reactors. More specifically, the present invention relates to an improved nuclear fuel assembly especially adapted for use in a boiling water reactor to improve the undermoderated condition that can exist at the top of a boiling water reactor fuel assembly.

Of course, it is known to generate large amounts of heat and energy through nuclear fission in a nuclear reactor. Energy is dissipated as heat in elongated nuclear fuel rods. Typically, a nuclear fuel assembly includes a number of nuclear fuel rods that are grouped together to form a nuclear fuel assembly. Such fuel assemblies include a number of elongated rods supported between upper and lower tie plates. For example, nuclear fuel assemblies can be formed by a 7×7, 8×8, 9×9, 10×10, and 11×11 rod array.

In a typical boiling water reactor fuel assembly, the assembly may only include fuel rods or may also include moderation rods. For example, in a nuclear fuel assembly having a 10×10 array, the 100 rods that form the array may either be 100 fuel rods or they can contain 1 or more non-fuel, water moderator rods with the remaining rods being fuel rods.

In this regard, early boiling water reactor fuel designs usually employed one or two water rods near the center of the fuel assembly which displaced one or two fuel rods. The purpose of the water rods was to place more water into the center of the assembly to improve neutron moderation and uranium utilization in the surrounding fuel rods.

Some more recent designs have employed an even greater number of water rods in the fuel assembly or have used large water channels. For example, Advanced Nuclear Fuels Corporation of Richland, Wash., U.S.A., has fabricated a 9×9-5 design which includes 76 fuel rods and 5 water rods and a 9×9 which includes 72 fuel rods and an internal water channel that displaces 9 fuel rods.

One of the problems encountered with boiling water reactor nuclear fuel assemblies is the undermoderation and overenrichment of the center region of such fuel assemblies. Further, the steam volume fraction in the water coolant of a boiling water reactor increases with respect to the height of the reactor core due to the generation of steam along the length of the fuel rods in the boiling process increasing the under-moderation.

At the bottom of the boiling water reactor fuel assembly, essentially 100% unvoided water surrounds the fuel rods. But, the percentage of unvoided water decreases along the length of the fuel assembly toward the top of the assembly. Accordingly, near the bottom of the fuel assembly, sufficient water exists to provide effective neutron moderation. However, due to the presence of steam in the upper part of the assembly, the assembly may be undermoderated. The addition of water rods or water channels to the fuel assembly provides water in the upper portion of the assembly that is needed to improve neutron moderation and enhance uranium utilization efficiency.

Additional designs have been proposed to overcome some of the difficulties encountered with respect to the moderation of neutrons and thus, uranium utilization efficiency. U.S. Pat. No. 4,957,698 discloses a fuel design that preferentially directs more unvoided water coolant into the upper portion of the fuel assembly. This allows relatively more fuel to be placed in the lower portion of the fuel assembly. The arrangement is designed to allow moderation of neutrons in the upper portion of the assembly while preserving a higher volume of fuel in the lower portion. The large number of fuel rods that can be used in the lower portion reduces the linear heat generation rate (power peaking) in the assembly.

U.S. Pat. No. 4,664,882 discusses a segmented fuel and moderator rod and fuel assembly for a boiling water reactor. The segmented rod has a lower fuel region and an upper moderator region for passing coolant through the upper portion of the boiling water reactor core which is normally undermoderated. The segmented rod displaces one or more conventional fuel rods in the fuel bundle.

Fuel rods including a water rod portion are also disclosed in Japanese Laid Open Application Nos. 59-18039 and 60-201284.

German Published Patent Application (Offenlegungsschrift) DE 38 24 082 A1 discusses a fuel assembly including a central water rod. The fuel arrangement includes shorter fuel rods than conventional fuel rods.

Despite the advances in the art of fuel assembly designs, a need still exists for a design that provides the maximum number of fuel rods with adequate moderation that is economical and reliable.

SUMMARY OF THE INVENTION

The present invention provides an improved fuel assembly and method for using same that provides improved moderation and thereby associated benefits.

To this end, a fuel assembly for a boiling water nuclear reactor is provided comprising an elongated enclosed central water channel including wall members that define an enclosed fluid flow path therethrough, the channel includes a lower opening for receiving water and allowing water to flow through the fluid flow path and at least one outlet opening. At least one partial water rod is provided that is coupled to a partial fuel rod so as to be disposed axially above the partial fuel rod. The partial water rod includes an inlet opening in fluid communication with the outlet opening of the central water channel so as to allow water to flow from the water channel into an interior of the partial water rod and through an outlet at an end of the partial water rod.

In an embodiment of the present invention, a fuel assembly for a boiling water reactor is provided comprising a central water channel including a lower section having a lower opening for receiving water and an upper section, the upper and lower section are secured axially via a manifold with respect to each other. A plurality of partial fuel rods having a length that is less than the length of the water channel are provided. A plurality of partial water rods are provided that are coupled to the partial fuel rods and disposed axially above the partial fuel rods, the partial water rods include inlet openings. A manifold that secures the upper and lower sections together is provided. The manifold also couples the partial water rods to the central water channel and includes a plurality of outlet openings in fluid communication with inlet openings of the partial water rods causing at least a portion of water flowing through the lower section of the central water channel to enter an interior of the partial water rods.

The present invention also provides a method for moderating a fuel assembly. In a fuel assembly including an enclosed central water channel surrounded by a plurality of fuel rods at least one partial fuel rod is axially coupled to a partial water rod having an inlet opening, the partial water rod being coupled to the central water channel so that an outlet opening of the water channel is in fluid communication with the inlet opening of the water rod. The method comprises the step of causing water to flow through the central water channel and at least a portion of the water to flow through the outlet opening of the water channel as well as through the inlet opening into an interior of the partial water rod.

An advantage of the present invention is that substantially unvoided water is passed into the partial water rods, not a mixture of water and steam. Unvoided water is a much better moderator providing a higher shutdown margin and better fuel cycle performance.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
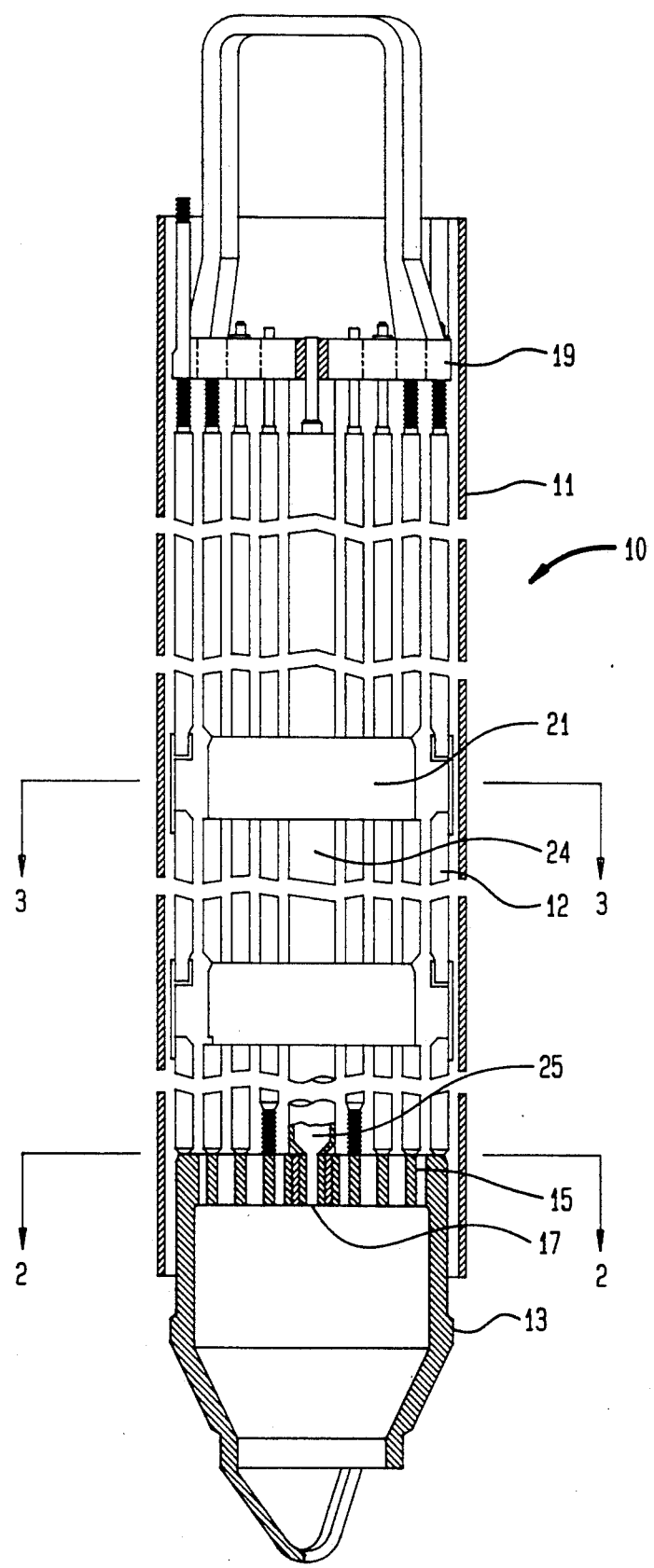
FIG. 1 illustrates a vertical section view of a boiling water reactor fuel assembly of the present invention.
Figure 2:
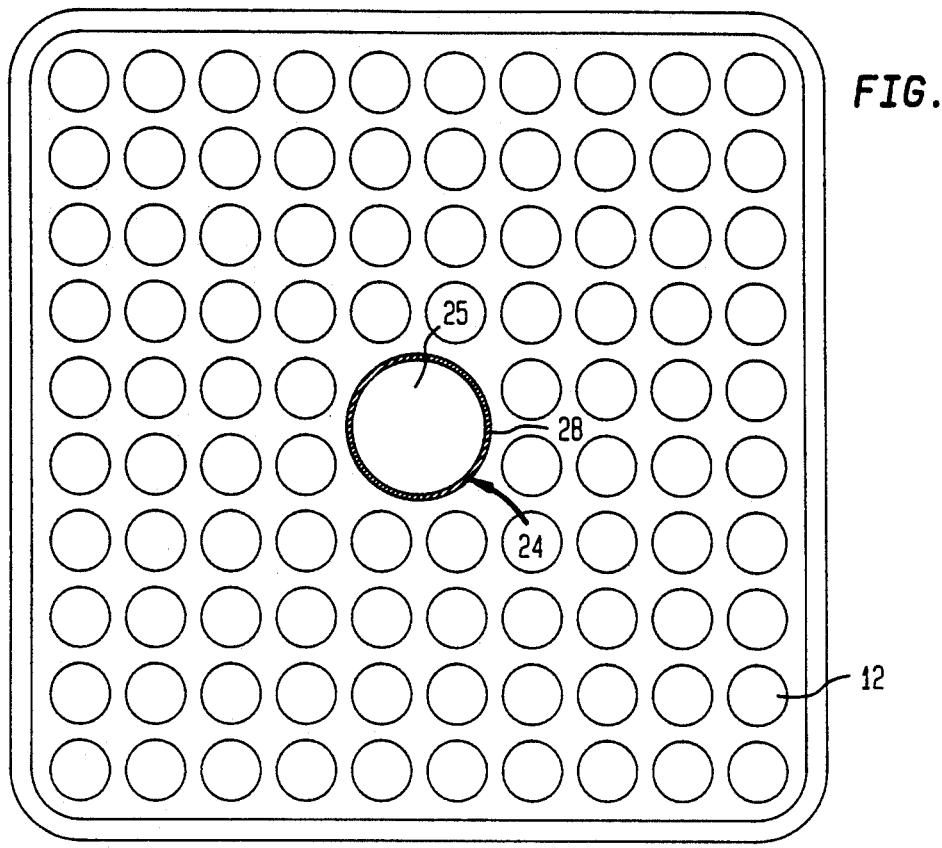
FIG. 2 illustrates a bottom sectional view taken along lines II—II of the fuel assembly of FIG. 1.

The present invention provides an improved fuel assembly for a boiling water reactor.

By increasing the hydrogen to fuel ratio in the largely voided upper portion of a BWR core, the fuel cycle cost performance can be improved. With the advent of longer fuel cycles, adequate shutdown margin is most easily achieved by a larger coolant space in the central region of the bundle at the upper part of the core. At the largely unvoided, bottom region of the core, it is desirable to have the maximum number of fuel rods consistent with adequate moderation to enhance the operating limits of the core. The present invention provides a fuel assembly that meets these objectives with an economical as well as reliable fuel assembly.

For example, an array in which only four fuel rods were removed from the bottom half of the core demonstrated an equivalent fuel cycle cost advantage of $3,000 per assembly or about $17 per kilogram of fuel as compared to an array in which twelve fuel rods were removed over the total assembly length. Furthermore, fuel assembly fabrication costs are reduced in a preferred embodiment of the invention in which circular rather than more expensive square water channels are used.

At the outset, it should be noted that although reference is made in the specification and figures to a 10×10 rod array, such an array has only been selected for illustrative purposes. Of course, the present invention can be used with other fuel assembly arrays, e.g., 7×7, 8×8, 9×9, 11×11, etc.

Generally, the structure of the boiling water assembly, except as set forth herein, is the same as that set forth in U.S. Pat. No. 4,708,846, the disclosure of which is hereby incorporated by reference. For example, the assembly 10 includes an outer flow channel 11 and inlet nozzle 13 which supports a lower tie plate 15 and has at its lower end an opening 17 for the reception of cooling water. There are a number of full length fuel rods 12 which are supported at their lower ends at the lower tie plate 15 and which extend at their upper ends into an upper tie plate 19. The fuel rods are held spaced apart from one another by grid spacers 21.

As is known, the fuel rods 12 can comprise a metal cladding, preferably an alloy of zirconium, such as Zircaloy-2. Contained within the cladding is a stacked column of fuel pellets, preferably $UO_2$.

Pursuant to the present invention, a central water channel 24 is provided. The central water channel 24 preferably extends for the length of the fuel assembly 10 and includes an inlet opening 25. The inlet opening 25 allows water to flow into an interior 27 of the central water channel 24 that is defined by walls 28. An outlet opening is provided at a top of the central water channel 24 allowing fluid to flow out of the central water channel.

In the illustrated embodiment, a 10×10 array is illustrated. The central water channel 24, in the embodiment illustrated, has replaced four of the fuel rods 12. Therefore, 96 full or partial fuel rods remain. Sub-cooled unvoided water is circulated through the central water channel 24 by being received through the inlet opening 25. This provides adequate moderation, in the lower portion of the fuel assembly 10, while providing the largest number of fuel rods 12 in the lowermost region of the core where pellet-cladding-interaction (PCI) can be a problem. Thus, pellet cladding interaction limits which are a function of heat rate per linear foot can be increased because there are more fuel rods in the bottom region of the core. As discussed in more detail hereinafter, the central water channel 24 provides sufficient moderation for the upper regions of the fuel assembly 10.

Figure 4:
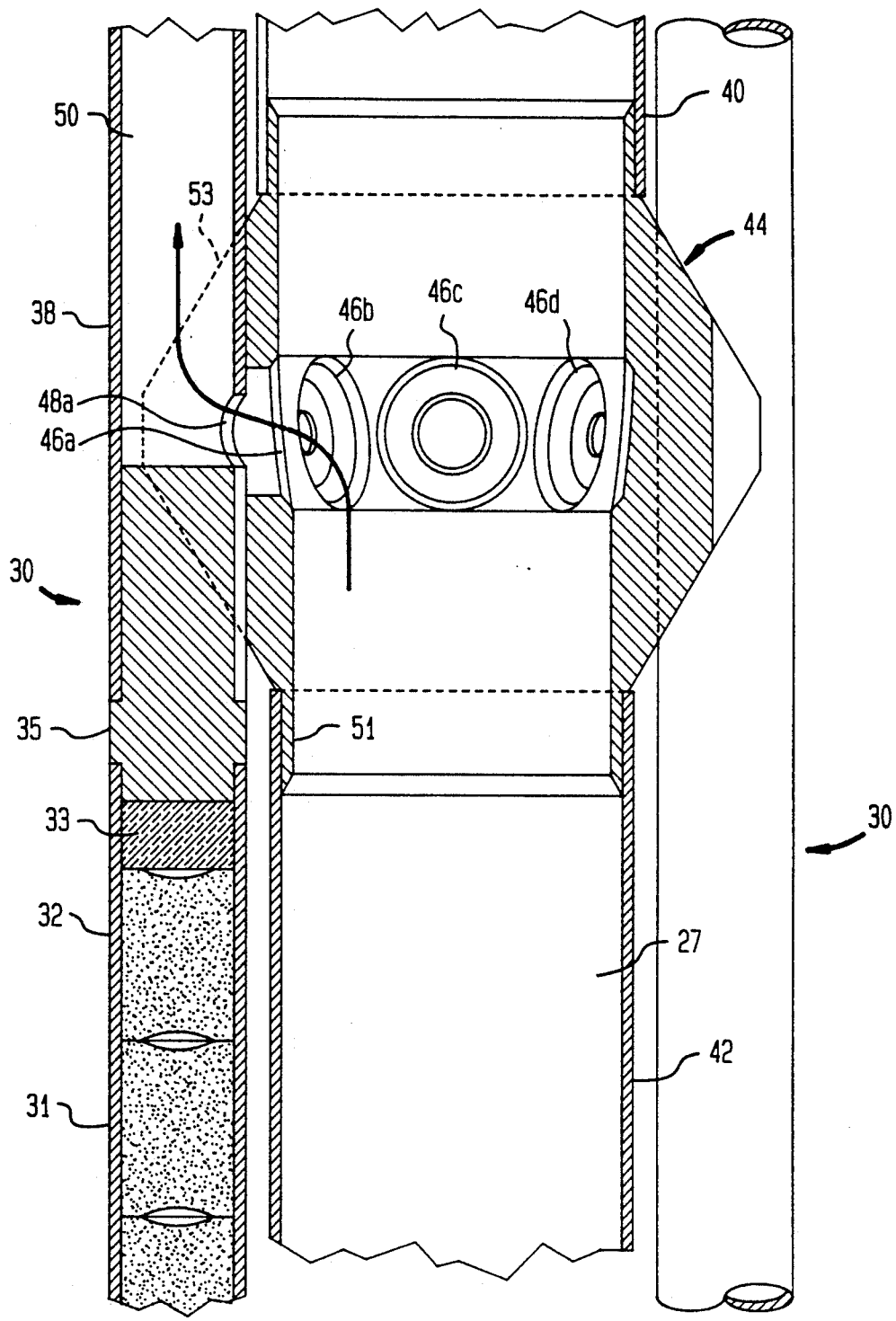
FIG. 4 illustrates a side elevational view of a cross-sectional view of the fuel assembly taken along lines IV—IV of FIG. 3.

Referring now to FIG. 4, the present invention also includes the use of modified fuel rods 30. At least one modified fuel rod 30 is located in juxtaposition to the central water channel 24. In the illustrated embodiment of the 10×10 array, eight (8) such modified fuel rods 30 are used. However, any number of such modified fuel rods 30 can be used depending on the fuel array used.

The modified fuel rods 30 include a fuel portion 31 that extends for approximately one half of the length of a typical fuel rod 12. Accordingly, the modified fuel rods 30 only contain fuel up to the central region of the core.

The fuel portion 31 of the modified fuel rod 30 includes a fission gas plenum and plenum spring located at the bottom of the rods. The upper end 32 of the fuel portion 31 includes an insulator disk and end cap 33 preferably constructed from $Al_2O_3$.

Additionally, the modified fuel rods 30 includes an extended connector member 35. The connector member 35 allows a partial water rod 38 to be coupled to the fuel portion 31 and disposed axially thereto. The partial water rod 38, similar to the fuel portion 31 of the modified fuel rod 30, has a length that is approximately one half the length of the partial fuel rod 30. Accordingly, the partial water rods 38 surrounded the upper portions of the central water channel 24.

As illustrated in FIG. 4, the central water channel includes an upper section 40 and lower section 42. The upper section 40 and lower section 42 are secured together by a manifold 44. To this end, the upper and lower water channels 40 and 42 are seal welded to the manifold 44. The upper section, lower section, and manifold 40, 42, and 44, respectively, define a channel 27 through which water can flow. This flow path is in addition to the flow paths into the modified fuel rods 30.

Figure 3:
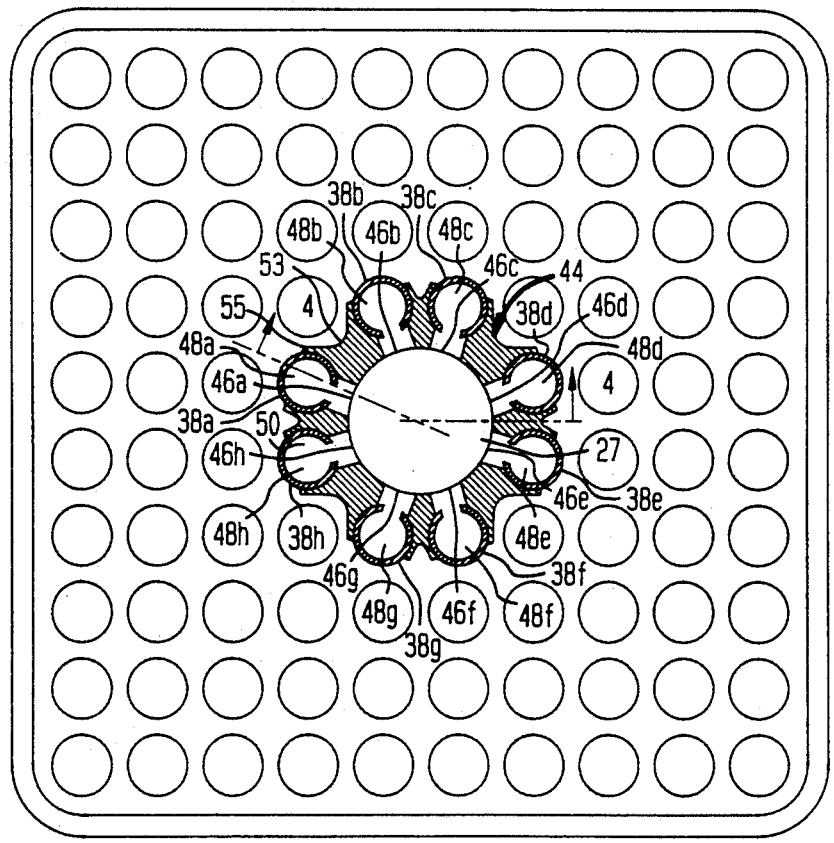
FIG. 3 illustrates a top elevational view of a cross-section of the fuel assembly of FIG. 1 taken along lines III—III.

As illustrated in FIGS. 3 and 4, the manifold 44 includes a plurality of outlet openings 46. For example, the manifold 44 includes an outlet opening 46a and correspondingly, the partial water rods 38a includes an inlet opening 48a. Likewise, the other partial water rods 38 include inlet openings 48 that correspond to outlet openings 46 in the manifold 44. The inlet openings 48 of the partial water rods 38, and outlet openings 46 of the manifold 44 are so constructed and arranged that fluid communication is established between the outlet openings 46 of the manifold 44 and the inlet openings 46 of each of the partial water rods 38.

Due to the construction of the lower section 42 of the water channel 24 and manifold member 44, at least a portion of the fluid that flows through the central water channel 24 will be directed into the inlet openings and therefore the interior 50 of the partial water rods 38. To this end, the manifold 44 includes an inclined outside surface that functions as a flow stripper, stripping water on the outside surface of the central channel and directing it toward the modified fuel rods 30.

The water rods 38 are coupled to the water channel 24 by the manifold 44. The manifold 44 includes resilient or spring member 53 that securely couple the water rods 38 to the central water channel 24. Preferably, as illustrated in FIG. 3, the spring member 53 includes spring fingers 55 machined into the manifold 44 that clamp the water rod 38 section in position while allowing axial motion.

Fretting is not a problem because the spring member 53 does not completely relax during irradiation and since several mils clearance must be present for fretting to occur where there is a large contact surface. Further, the manifold 44 is directly adjacent to a spacer 21 further supporting the rods.

To obtain the maximum amount of unvoided water in the upper region of the core, the upper section 40 of the central water channel 24 has a maximum outside diameter such that vibratory contact between the central water channel 24 and surrounding water rods 38 is prevented. As illustrated in FIG. 4, the inner and outer diameters of the upper section 40 are slightly greater than those of the lower section 42. The combined cross-section of the upper section 40 and the surrounding water rods 38 is considerably larger (approximately double) compared with that of the lower section 42. The manifold 44 forms the transition between the larger upper section 40 of the water channel 24 and the smaller lower water section 42.

Preferably, the manifold 44 is located just above or below the central spacer 21 of the assembly 10. The spacer locations can be maintained by rings spot welded to the central water channel above and below the spacer. Variations in the ring design would allow the same spacer design to be used for the full bundle length.

Power peaking may be expected at the tip of the fuel portion 31 of the modified fuel rod 30. Accordingly, the manifold 44 is located just above the top of the fuel portion 31. The extent of such peaking is thereby be reduced. Additionally, if desired, fuel pellets having a reduced enrichment or an $Al_2O_3$ insulator disc containing $B_4C$ can be used if required to reduce local peaking.

If desired, water that enters the partial water rods 38 from the central water channel 24 can be injected toward surrounding fuel rods 12 at critical points in the core. This can enhance the critical power performance of those critical rods by increasing the water film thickness on the rod surface.

Preferably, the outlet openings 46 in the manifold 44 are larger than the inlet openings 48 in the partial water rods 38 so that controlled and uniform flow rates between all of the partial water rods can be maintained while accommodating significant angular misalignment or relative axial motion during irradiation.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A fuel assembly for a boiling water nuclear reactor comprising:

an elongated central water channel surrounded by a plurality of fuel rods located substantially parallel to the central water channel, the central water channel having at least one wall member that defines an enclosed flow path therethrough, the central water channel including a lower opening for receiving moderator and allowing moderator to flow through the enclosed flow path defined by the at least one wall member, and the central water channel further including at least one outlet opening; and at least one partial water rod having at least one wall member that defines an enclosed flow path therethrough, the partial water rod being coupled to a portion of one of the plurality of fuel rods so as to be disposed axially above a fuel portion of the fuel rod and further including an inlet opening in communication with at least one outlet opening of the central water channel and defining a flow path for receiving moderator and allowing moderator to flow from the channel into an interior of the partial water rod.

2. The fuel assembly of claim 1 wherein the inlet opening of the partial water rod is smaller than the outlet opening of the central water channel.

3. The fuel assembly of claim 1 wherein the central water channel includes means for directing the fluid flow path through the outlet opening into the inlet opening.

4. The fuel assembly of claim 1 including a manifold for coupling at least the central water channel to the partial water rod.

5. The fuel assembly of claim 4 wherein the central water channel includes an upper section and a lower section that are coupled together by the manifold.

6. A fuel assembly for a boiling water nuclear reactor comprising:

a water channel including a lower opening for receiving water and including a plurality of outlet openings;

a plurality of fuel rods at least some of which have a length that is less than a length of the water channel and that are coupled to water rods that are disposed axially above the fuel rods, each of the water rods including an inlet opening in fluid communication with an outlet opening of the water channel creating a fluid flow path from an interior of the water channel into an interior of the water rod; and the water channel includes means for coupling the water rods to the water channel.

7. The fuel assembly of claim 6 wherein the means for coupling includes a manifold that defines the outlet openings of the water channel.

8. The fuel assembly of claim 6 wherein the inlet openings are smaller than the outlet openings.

9. The fuel assembly of claim 7 wherein the water channel includes an upper section and a lower section secured together by the manifold.

10. The fuel assembly of claim 7 wherein an inner cross-sectional area defined by the manifold and outer portions of the water rods is greater than the cross-sectional area of the lower section of the water channel.

11. A fuel assembly for a boiling water reactor comprising:

a central water channel including a lower section having a lower opening for receiving water and an upper section, the upper and lower section being secured together axially with respect to each other;

a plurality of partial fuel rods having a length that is less than the length of the central water channel;

a plurality of partial water rods coupled to the partial fuel rods and disposed axially above the partial fuel rods, each of the partial water rods including an inlet opening; and a manifold that secures the upper and lower sections of the central water channel together in fluid communication and couples the partial water rods to the central water channel and includes a plurality of outlet openings in fluid communication with inlet openings of the partial water rods causing at least a portion of water flowing through the lower section of the central water channel to enter an interior of the partial water rods.

12. The fuel assembly of claim 11 wherein the inlet openings of the partial water rods are smaller than the outlet openings of the manifold.

13. The fuel assembly of claim 11 wherein the manifold includes spring members located between the partial water rods.

14. The fuel assembly of claim 11 wherein an inner cross-sectional area defined by the manifold and outer wall portions of the partial water rods is greater than a cross-sectional interior area of the lower section of the water channel.

15. The fuel assembly of claim 11 including a connector received within a top portion of the partial fuel rod and a bottom portion of the partial water rod for coupling the partial fuel rod and partial water rod together.

16. The fuel assembly of claim 15 wherein the partial fuel rod includes an insulator located between a fuel region within the partial fuel rod and the connector.

17. The fuel assembly of claim 11 wherein the central water channel is surrounded by partial fuel rods coupled to partial water rods.

18. The fuel assembly of claim 11 wherein the partial fuel rods have a length that is approximately one half a length of the central water channel.

19. The fuel assembly of claim 11 wherein the fuel assembly is a $10 \times 10$ array and the central water channel replaces 4 fuel rods.

20. The fuel assembly of claim 11 wherein 8 partial fuel rods and partial water rods are provided.

21. A method for moderating a fuel assembly comprising the steps of:

locating a plurality of fuel rods around an enclosed central water channel located within a center of a fuel assembly, the central water channel having an outlet opening;

providing at least one partial fuel rod that is axially coupled to a partial water rod having an inlet opening;

coupling the partial water rod to the central water channel so that the outlet opening is in fluid communication with the inlet opening; and causing water to flow through the central water channel through the outlet opening and through the inlet opening into an interior of the partial water rod.

22. The method of claim 21 including the step of surrounding the central water channel with partial fuel rods coupled to partial water rods.

* * * * *